United States Patent Office 3,763,179
Patented Oct. 2, 1973

3,763,179
2-IMIDAZOL-1-YL BENZOPHENONES
Martin Gall, Kalamazoo, Mich., assignor to The Upjohn Company, Kalamazoo, Mich.
No Drawing. Filed May 5, 1972, Ser. No. 250,521
Int. Cl. C07d 57/02
U.S. Cl. 260—309
10 Claims

ABSTRACT OF THE DISCLOSURE 2-imidazol-1-yl benzophenones of the Formula II

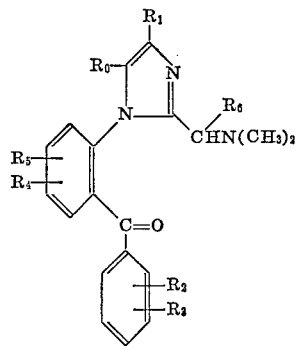

(II)

wherein $R_0$ and $R_1$ are selected from the group consisting of hydrogen and alkyl of 1 to 3 carbon atoms, and hydroxymethyl; wherein $R_2$, $R_3$, $R_4$, and $R_5$ are selected from the group consisting of hydrogen, alkyl or 1 to 3 carbon atoms, inclusive, halogen, nitro, trifluoromethyl, and alkoxy, alkylthio, alkylsulfinyl, alkylsulfonyl, in which carbon chain moieties are of 1 to 3 carbon atoms, inclusive, and dialkylamino in which the alkyl group is defined as above; and wherein $R_6$ is selected from the group consisting of hydrogen, and alkyl defined as above, are produced by heating an imidazolobenzodiazepine of the Formula I

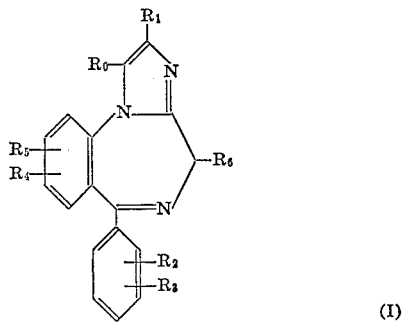

(I)

wherein $R_0$, $R_1$, $R_2$, $R_3$, $R_4$, $R_5$, and $R_6$ are defined as above with formic acid and formaldehyde.

The compound of Formula II as well as the pharmacologically acceptable acid addition salts thereof are useful as sedatives and tranquilizers particularly in mammals and birds.

BACKGROUND OF THE INVENTION

Field of the invention

This invention is directed to new organic compounds and is particularly concerned with novel 2-imidazol-1-yl-benzophenones and a process for the production thereof.

The novel compounds and the process of production therefore can be illustratively represented as follows:

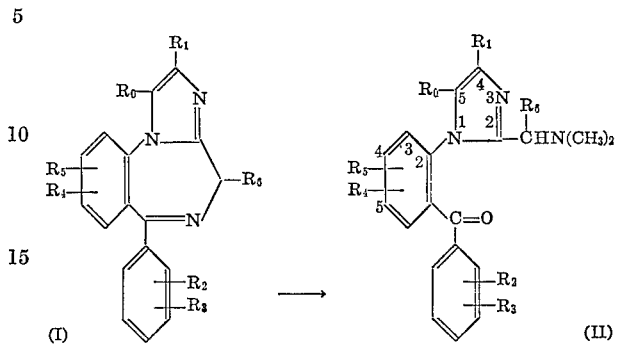

(I) → (II)

wherein $R_0$ and $R_1$ are selected from the group consisting of hydrogen and alkyl of 1 to 3 carbon atoms and hydroxymethyl; wherein $R_2$, $R_3$, $R_4$ and $R_5$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, in which the carbon chain moieties are of 1 to 3 carbon atoms, inclusive, and dialkylamino in which the alkyl group is defined as above; and wherein $R_6$ is selected from the group consisting of hydrogen and alkyl of 1 to 3 carbon atoms, inclusive.

The invention also comprises the production of pharmacologically acceptable acid addition salts of the compounds of Formula II above.

The process of this invention comprises: heating a 4H-imidazo[1,2-a][1,4]benzodiazepine of Formula I with concentrated formic acid (88%) and Formalin solution at about 75–100° C. to give the corresponding 2-[2-[(dimethylamino)methyl]imidazol-1-yl]benzophenone II.

If pharmacologically acceptable acid addition salts of II are are desired, the selection compound II is reacted with a selected acid in stoichiometric proportions.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkoxy, alkylthio, alkylsulfinyl, alkylsulfonyl which is of 1 to 3 carbon atoms, inclusive, is defined as lower-alkyl of 1 to 3 carbon atoms, inclusive, above.

Halogen includes fluorine and chlorine, principally, but also bromine and iodine substituents are possible.

The novel compounds of the Formula II, including acid addition salts thereof, have sedative, tranquilizing and muscle relaxant effects in mammals and birds.

The acid addition salts of compounds of Formula II contemplated in this invention, are hydrochloride, hydrobromides, hydriodides, sulfates, phosphates, cyclohexanesulfamates, methanesulfonates, and the like, prepared by reacting a compound of Formula II with the stoichiometrically calculated amount of the selected pharmacologically acceptable acid.

Sedative effects of 2',5-dichloro-2-[2-[(dimethylamino)methyl]imidazol-1-yl]benzophenones are shown by the following tests in mice:

Chimney test [Med. Exp. 4, 145 (1961)]: The effective intraperitoneal dosage for 50% of mice ($ED_{50}$) is 2.5 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 2.2 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 2.2 mg./kg.

Nicotine antagonism test: Mice in a group of 6 are injected with the test compound 2′,5-dichloro-2-[2-dimethylamino)methyl]imidazol-1-yl]benzophenone. Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 1.0 mg./kg. of the test compound protected 50% of the mice against (2) and 1.2 mg./kg. against (3) ($ED_{50}$).

Antagonism to strychnine (as sulfate): The effective dosage ($ED_{50}$) of 2′,5-dichloro-2-[2-dimethylamino)methyl]imidazol-1-yl]benzophenone is less than 50 mg./kg. orally in mice. The test consists in orally administering into groups of 6 mice the test compound, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The pharmaceutical forms contemplated by this invention include pharmaceutical compositions suited for oral, parenteral and rectal use, e.g., tablets, powder packets, cachets, dragées, capsules, solutions, suspensions, sterile injectable form, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil e.g., coconut oil, sesame oil, safflower oil, cottonseed oil, peanut oil may be used for preparing solutions or suspensions of the active drug. Sweetening, coloring, and flavoring agents may be added.

For mammals and birds food premixes, with starch, oatmeal, dried fishmeat, fishmeal, flour, and the like can be prepared.

The compounds of Formula II are further useful to increase meat production in cattle, to provide a more favorable weight versus feed intake ratio, and to increase milk production.

As tranquilizer the compounds of Formula II can be used in dosages of 0.1 mg.–10 mg./kg. in oral or injectable preparations as described above, to alleviate tension and anxiety in mammals, or birds, such as e.g., occurs when animals are in travel.

Other acid addition salts of the compounds of Formula II can be made such as the fluosilicic acid addition salts which are useful mothproofing compounds or the trichloroacetates useful as herbicides against Johnson grass, Bermuda grass, yellow foxtail, and green foxtail, and quack grass.

The starting materials of Formula I of this invention, substituted or unsubstituted 6-phenyl-4H-imidazo[1,2-a][1,4]benzodiazepines, are produced by reacting a 1,3-dihydro-2H-1,4-benzodiazepine-2-thione of Formula III:

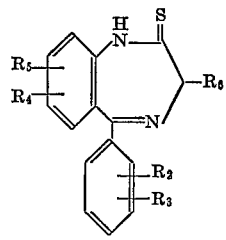

wherein $R_2$, $R_3$, $R_4$, $R_5$, and $R_6$ are as defined above, with a selected 2-aminoacetaldehyde dialkyl acetal or 2-aminoketone dialkyl ketal of Formula IV,

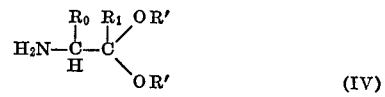

wherein $R_1$, $R'$, and $R_0$ are hydrogen or alkyl, defined as above, to give the corresponding [[5-phenyl-1,4-benzodiazepine-2-ylidene] - 2 - amino]aldehyde dialkyl acetal or ketone dialkyl ketal of Formula V

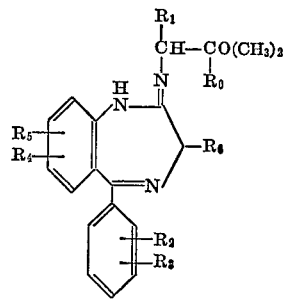

Treating V with titanium tetrachloride in an organic solvent between 50–100° C. gives the corresponding 6-phenyl-4H-imidazo[1,2-a][1,4]benzodiazepine I. The compounds of Formula I, wherein $R_6$ is alkyl, can be prepared by reaction of a compound of Formula I ($R_6$ is hydrogen) with base, e.g. lithium diisopropylamine, in monoglyme or tetrahydrofurane, and an alkylating or acylating agent of the type $R_6X$, wherein X is halogen as defined above or a tosylate. The subsequent preparations further illustrate the synthesis of starting materials of Formula I.

In carrying out the process of the present invention, a selected 6-phenyl-4H-imidazo[1,2-a][1,4]benzodiazepine I is dissolved in formic acid preferably at room temperature. The formic acid used may be between 75–90% as an aqueous solution and is used in an excess of 5 to 25 times the molar quantity of I. This solution is admixed with a 37% aqueous formalin solution in excess of 2 to 25 molar equivalents per mol equivalent of starting Compound I. In the preferred embodiment of this invention the reaction mixture is heated to 75–100° C. but lower temperatures can be used. The reaction period, at about 100° C., is from 1 to 25 hours. At the termination of the reaction, the mixture is cooled, neutralized e.g. with aqueous sodium or potassium hydroxide, and the product II isolated and purified by conventional procedures e.g. extraction, distillation in vacuo, chromatography, and crystallization.

The following preparations and examples are illustrative of the processes and products of the present invention, but are not to be construed as limiting.

PREPARATION 1

[[7-chloro-5-phenyl-1,3-dihydro-2H-1,4-benzodiazepine-2-ylidene]amino]-acetaldehyde-dimethyl acetal A solution of 27.1 g. (0.1 mole) of 7-chloro-1,3-dihydro-5-phenyl-2H-1,4-benzodiazepine-2-one and 100 ml. of aminoacetaldehyde dimethyl acetal (Aldrich) in 700 ml. of tetrahydrofuran was cooled to 0° C. by an ice-salt bath. A complex of titanium tetrachloride was prepared by slowly adding with vigorous stirring 10.57 (0.055 mole) of titanium tetrachloride to 330 ml. of tetrahydrofuran.

This solution was slowly added with stirring during 10 minutes to the above solution at −5 to 0° C. After 0.5 hour at 0° C. the temperature was allowed to come to room temperature and the solution was stirred over night. Then 5 ml. more of titanium tetrachloride was added dropwise and the solution was stirred for 7.5 hours and allowed to stand overnight. Then 65 ml. of water was slowly added with vigorous stirring. The mixture was filtered and the solid was concentrated in vacuo to a small volume and diluted with water giving 34.8 g. of [[7-chloro-5-phenyl-1,3 - dihydro - 2H - 1,4-benzodiazepine-2-ylidene]amino]-acetaldehyde-dimethyl acetal of melting point 142–154° C. This was dissolved in 400 ml. of 2-propanol filtered hot, concentrated to 350 ml. and cooled yielding 26.94 g. (75.4%) of [[7 - chloro - 5 - phenyl-1,3-dihydro-2H-1,4-benzodiazepine - 2-ylidene]amino]acetaldehyde-dimethyl acetal as a while crystalline solid of melting point 158.5–160.5° C.

*Analysis.*—Calcd. for $C_{19}H_{20}ClN_3O_2$ (percent): C, 63.77; H, 5.63; Cl, 9.91; N, 11.74. Found (percent): C, 63.67; H, 5.72; Cl, 10.15; N, 12.02.

PREPARATION 2

[[5-(o-chlorophenyl)-1,3-dihydro-2H-1,4-benzodiazepine-2-ylidene]amino]acetaldehyde dimethyl acetal A solution of 11.4 g. (40 mmol.) of 1,3-dihydro-5-(o-chlorophenyl)-2H-1,4-benzodiazepine-2-thione in 400 ml. of n-butanol was refluxed with 0.12 mole (12.6 g.) aminoacetaldehyde dimethyl acetal for 7 hours and then allowed to stand and cool over the weekend. The butanol was removed in vacuo to give a solid which was dissolved in hot ethyl acetate, filtered and permitted to cool to give 14.08 g. of [[5 - (o-chlorophenyl)-1,3-dihydro-2H-1,4-benzodiazepine-2-ylidene]amino]acetaldehyde dimethyl acetal in two crops of melting point 179–182° C. An analytical sample of small white prisms had a melting point of 181–182° C.

*Analysis.*—Calcd. for $C_{19}H_{20}ClN_3O_2$ (percent): C, 63.77; N, 5.63; N, 11.74; Cl, 9.91. Found (percent): C, 63.99; H, 5.56; N, 11.84; Cl, 9.97.

PREPARATION 3

[[7-chloro-5-(o-chlorophenyl)-1,3-dihydro-2H-1,4-benzodiazepine-2-ylidene]amino]acetaldehyde dimethyl acetal A solution of 7-chloro-5-(o-chlorophenyl)-1,3-dihydro-2H-1,4-benzodiazepine-2-thione (6.40 g., 0.020 mol.) and aminoacetaldehyde dimethyl acetal (6.30 g., 0.060 mol.) was prepared in 200 ml. of n-butanol and refluxed 3 hours. The reaction was permitted to cool to room temperature overnight. The resulting precipitate was filtered and washed with ethyl acetate and hexane to give 6.7 g. (85.4%) of white powder of melting point 176–177.5° C. The mother liquor was concentrated in vacuo to give 1.6 g. of brown solid, which was not further investigated. An analytical sample of white prisms obtained from ethyl acetate/hexane had a melting point 175.5–176.5° C.

*Analysis.*—Calcd. for $C_{19}H_{19}Cl_2N_3O_2$ (percent): C, 58.17; H, 4.88; N, 10.71; Cl, 18.07. Found (percent): C, 58.03; H, 4.86; N, 10.85; Cl, 18.17.

PREPARATION 4

[[7 - chloro - 5 - (o-chlorophenyl)-1,3-dihydro-2H-1,4-benzodiazepine - 2 - ylidene]-α-amino]propionaldehyde dimethyl acetal A solution of 7-chloro-1,3-dihydro-2H-5-(o-chlorophenyl)-1,3-benzodiazepine-2-thione (6.40 g., 0.020 mol.) and α-amino-propionaldehyde dimethyl acetal (6.30 g., 0.050 mol.) in 200 ml. of n-butanol was refluxed for 20 hours. The solution was cooled to room temperature and the n-butanol was removed in vacuo to give a red-orange oil. The desired product was obtained by trituration from ethyl acetate/hexane. In this way 4.80 g. of solid [[7-chloro - 5 - (o-chlorophenyl)-1,3-dihydro-2H-1,4-benzodiazepine - 2-ylidene]-α-amino]propionaldehyde dimethyl acetal of melting point 153–155° C. was obtained. An analytical sample had a melting point of 157° C.

*Analysis.*—Calcd. for $C_{20}H_{21}ClN_3O_1$ (percent): C, 59.12; H, 5.21; N, 10.34; Cl, 17.45. Found (percent): C, 59,15; H, 5.24; N, 10.36; Cl, 17.09.

As seen from Preparations 1 to 4, starting materials of Formula V can be made from the known 5-phenylbenzodiazepine-2-ones or 2-thiones of the formula

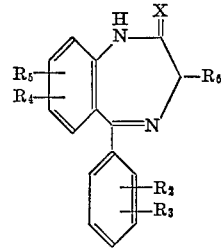

(III)

wherein X is oxygen or sulfur, $R_1$, $R_2$, $R_3$, $R_4$, $R_5$, and $R_6$ are defined as above by condensing 111 with an α-amino aldehyde alkyl acetal or ketone alkyl ketal

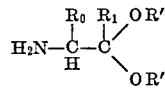

(IV)

wherein $R_0$, $R_1$, and $R'$ are defined as above.

Products V can also be made by condensing a 2-alkoxy Compound VI:

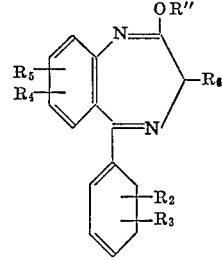

(VI)

wherein R″ is alkyl defined as above with a compound of Formula IV. In this manner compounds of Formula V can be prepared such as:

[[7-trifluoromethyl-5-(o-chlorophenyl) - 1,3-dihydro-2H-1,4 - benzodiazepine-2-ylidene]amino]acetaldehyde dimethyl acetal;

[[7 - chloro - 5 - (2,6-difluorophenyl)-1,3-dihydro-2H-1,4-benzodiazepine-2-ylidene]amino]acetaldehyde dimethyl acetal;

[[7 - nitro - 5 - (o-chlorophenyl) - 1,3 - dihydro-2H-1,4-benzodiazepine - 2 - ylidene]amino]acetaldehyde dimethyl acetal;

[[6 - dimethylamino - 5 - (p-methylthiophenyl)-1,3-dihydro-2H-1,4-benzodiazepine - 2 -ylidene]amino]acetaldehyde dimethyl acetal;

[[8 - bromo- 5 - (2,4 - diethoxyphenyl)-1,3-dihydro-2H-1,4 - benzodiazepine - 2 -ylidene]amino]acetaldehyde dimethyl acetal;

[[9 - propylsulfonyl - 5 - (p - nitrophenyl) - 1,3 - dihydro-2H-1,4-benzodiazepine - 2 - ylidene]amino]acetaldehyde dimethyl acetal;

[[9 - isopropylsulfinyl - 3 - methyl - 5 - (o-methoxyphenyl)-1,3-dihydro - 2H - 1,4 - benzodiazepine-2-ylidene]amino]acetaldehyde dimethyl acetal;

[[6 - methylamino - 3 - ethyl - 5 - (m-fluorophenyl)-1,3-dihydro-2H-1,4 - benzodiazepine - 2 - ylidene]amino]acetaldehyde dimethyl acetal;

]]7 - iodo - 3 - propyl-5-(2,6-difluorophenyl)-1,3-dihydro-2H - 1,4 - benzodiazepine - 2 - ylidene]amino]acetaldehyde dimethyl acetal;

[[8 - propylsulfonyl - 5 - phenyl - 1,3 - dihydro-2H-1,4-benzodiazepine - 2 -ylidene] - α - amino]propionaldehyde diethyl acetal;

[[7 - nitro - 5 - (o-chlorophenyl)-1,3-dihydro-2H-1,4- benzodiazepine-2-ylidene] - α - amino]propionaldehyde diethyl acetal;

[[7 - chloro - 5 - (o-chlorophenyl)-1,3-dihydro-2H-1,4-benzodiazepine - 2 - ylidene-[α-amino]propionaldehyde diethyl acetal;

[[7 - bromo - 5 - (2,6 - diethylphenyl) - 1,3 - dihydro-2H-1,4-benzodiazepine-2-ylidene] - α - amino]propionaldehyde diethyl acetal;

[[3,6,8 - trimethyl - 5 - (2,4 - dipropylphenyl) - 1,3-dihydro - 2H - 1,4 - benzodiazepine-2-ylidene]-α-amino]propionaldehyde diethyl acetal;

[[7 - fluoro - 5 - (2,6 - difluorophenyl) - 1,3-dihydro-2H-1,4 - benzodiazepine - 2 -ylidene]amino]propionaldehyde diethyl acetal;

[[7 - chloro - 5 - (o - chlorophenyl) - 1,3 - dihydro-2H-1,4 - benzodiazepine - 2 - ylidene]-α-amino]-2-butanone dipropyl ketal;

[[9 - bromo - 5 - (m-nitrophenyl) - 1,3 - dihydro-2H-1,4-benzodiazepine - 2 - ylidene]-α-amino] - 2 - butanone dipropyl ketal;

[[7 - nitro - 5 - phenyl - 1,3 - dihydro - 2H - 1,4 - benzodiazepine - 2 - ylidene]-α-amino]-2-butanone dipropyl ketal;

[[7 - chloro - 5 - (o-chlorophenyl) - 1,3 - dihydro-2H-1,4-benzodiazepine - 2 -ylidene]-α-amino]pentanaldehyde dimethyl ketal;

[[8 - chloro - 5 - (o-bromophenyl) - 1,3-dihydro-2H-1,4-benzodiazepine - 2 - ylidene]-α-amino] - 4 -octanone dimethyl ketal;
and the like.

PREPARATION 5

8-chloro-6-phenyl-4H-imidazol[1,2-a][1,4]benzodiazepine

[[7-chloro-5-phenyl - 1,3 - dihydro-2H-1,4-benzodiazepine-2-ylidene]amino]acetaldehyde dimethyl acetal (5.4 g., 0.015 mol.) was dissolved in 180 ml. of monoglyme and treated cautiously with 2.85 ml. (4.90 g., 0.026 mol.) of titanium tetrachloride. The black solution was refluxed for 4 hours by which time all of the starting material and unidentified intermediate had reacted (the starting material was consumed within 0.5 hour. The reaction mixture was cooled to room temperature, poured into 450 ml. of 5% cold aqueous sodium hydroxide and extracted with methylene chloride. The titanium salts were removed by filtration. The organic extract was washed with saturated aqueous sodium chloride solution, dried over anhydrous magnesium sulfate, concentrated in vacuo and the product crystallized from ethyl acetate to give 2.8 g. (63.6%) of 8-chloro-6-phenyl-4H-imidazo[1,2-a][1,4] benzodiazepine of melting point 147–148.5° C. An analytical sample had a melting point of 147.5–149° C.

*Analysis.*—Calcd. for $C_{17}H_{12}ClN_3$ (percent): C, 69.50; H, 4.12; N, 14.31; Cl, 12.07. Found (percent): C, 69.32; H, 4.04; N, 14.51; Cl, 12.08.

PREPARATION 6

6-(o-chlorophenyl)-4H-imidazolo[1,2-a][1,4] benzodiazepine

A solution of 8.1 g. (22.5 mmol.) of [[5-(o-chlorophenyl)-1,3-dihydro-2H-1,4-benzodiazepine - 2 - ylidene] amino]acetaldehyde dimethyl acetal in 270 ml. of monoglyme was treated with 3.38 ml. of titanium tetrachloride. After the initial vigorous reaction subsided, the mixture was heated to reflux on a steam bath for 5 hours. The reaction mixture was cooled to room temperature, poured into 800 ml. of cold (10°) 5% aqueous sodium hydroxide solution dried over anhydrous magnesium sulfate, and concentrated to a brown oil. The oil was chromatographed over 900 g. of silica gel and eluted with ethyl acetate and 5% and 10% methanol/ethyl acetate. The product was eluted in the more polar solvent to give a total of 5.37 g. of oil. A total of 2.14 g. of light brown crystalline solid was obtained (from ethyl acetate/Skellysolve B hexanes) having melting point 148.5–150° C.

*Analysis.*—Calcd. for $C_{17}H_{12}ClN_3$ (percent): C, 69.50; H, 4.12; N, 14.30; Cl, 12.07. Found (percent): C, 69.50; H, 4.13; N, 14.33; Cl, 12.37.

PREPARATION 7

8-chloro-6-(o-chlorophenyl)-4H-imidazo [1,2-a][1,4]benzodiazepine

[[7-chloro-5-(o-chlorophenyl) - 1,3 - dihydro-2H-1,4-benzodiazepine - 2 - ylidene]amino]acetaldehyde dimethyl acetal (7.84 g., 0.020 mol.) was dissolved in 100 ml. of chloroform. To the stirred solution was added, in two portions, 3.0 ml. of titanium tetrachloride (5.20 g., 0.027 mol.). The solution turned orange brown in color and warmed to the touch. A small amount of brown oily solid settled from solution. The mixture was kept at reflux for 5 hours at which time 30 ml. of monoglyme was added. Refluxing was continued overnight. Workup consisted of pouring the reaction mixture into a cold (0–5°) mixture of 5% aqueous sodium hydroxide/chloroform. The mixture was filtered to remove titanium salts. The solid was washed thoroughly with chloroform and 5% aqueous sodium hydroxide solution. The chloroform layers were combined, dried over anhydrous magnesium sulfate and concentrated in vacuo to give 6.6 g. of a brown solid. This material was recrystallized from ethyl acetate/hexane to give 5.3 g. (81%) of 8 - chloro-6-(o-chlorophenyl)-4H-imidazo[1,2-a][1,4]benzodiazepine of melting point 177.5–179° C. A second crop (0.53 g., 8%) was also collected. An analytical sample had a melting point of 179–180° C.

*Analysis.*—Calcd. for $C_{17}H_{11}Cl_2N_3$ (percent): C, 62.21; H, 3.38; N, 12.81; Cl, 21.60. Found (percent): C, 61.98; H, 3.27; N, 13.08; Cl, 21.72.

PREPARATION 8

4-methyl-8-chloro-6-(o-chlorophenyl)-4H-imidazo [1,2-a][1,4]benzodiazepine

Diisopropylamine (1.01 g., 10.0 mmol.) was added dropwise via syringe and with vigorous stirring to a solution of 10.0 mmol. of methyl lithium in 5.0 ml. of freshly distilled (from lithium aluminum hydride) monoglyme at −40.0° C. To this solution of lithium diisopropylamide was added via syringes, 2.94 g. (10.0 mmol.) of 8-chloro-6 - (o-chlorophenyl)-4H-imidazo[1,2-a][1,4]benzodiazepin, dissolved in 10.0 ml. of monoglyme. The reaction was permitted to warm gradually to room temperature. The solution was treated with 4.26 g. (30.0 mmol.) of methyl iodide and stirred for 15 minutes. The reaction mixture was quenched by pouring into cold (0–5° C.) aqueous 5% sodium hdyroxide solution and extracting into chloroform. The chloroform extracts were dried over anhydrous magnesium sulfate and concentrated in vacuo to give an oil. The 4 - methyl-8-chloro-6-(o-chlorophenyl)-4H-imidazo [1,2-a][1,4]benzodiazepine, thus obtained, was crystallized from ethyl acetate-hexane. The subsequent preparations further illustrate the synthesis of starting materials of Formula I.

PREPARATION 9

8-chloro-2-methyl-6-(o-chlorophenyl)-4H-imidazo [1,2-a][1,4]benzodiazepine

A sample of [[7-chloro-5-(o-chlorophenyl)-1,3-dihydro - 2H-1,4-benzodiazepine-2-ylidene]-α-amino]propionaldehyde dimethyl acetal (2.03 g., 5.00 mmol.) dissolved in 60 ml. of monoglyme was treated with 0.75 ml. (1.30 g., 6.85 mmol.) of reagent titanium tetrachloride. A vigorous reaction took place and a brown solid precipitated in the reaction flask. The mixture was refluxed under nitrogen for 4 hours. The reaction mixture was cooled to room temperature, poured into 250 ml. of cold 5% aqueous sodium hydroxide and extracted with chloroform (400 ml.). The chloroform layer was washed with brine, dried over anhydrous magnesium sulfate and concentrated in vacuo to give a solid. 8-chloro-2-methyl-6-(o-chlorophenyl) - 4H - imidazolo[1,2-a][1,4]benzodiazepine, thus obtained, was crystallized, in two crops, from ethyl acetate to give 960 mg. of prisms of melting point 169.5–170.5° C.

*Analysis.*—Calcd. for $C_{18}H_{13}Cl_2N_3$ (percent): C, 63.17; H, 3.83; N, 12.28; Cl, 20.72. Found (percent): C, 63.18; H, 3.88; N, 12.35; Cl, 20.75.

In the manner given in Preparations 1–9 above, other 4H - imidazo[1,2a][1,4]benzodiazepines of Formula Ia, can be synthetized such as:

8-bromo-6-phenyl-2-methyl-4H-imidazo[1,2-a][1,4] benzodiazepine;
8-fluoro-6-phenyl-1-methyl-4H-imidazo[1,2,-a][1,4] benzodiazepine;
8-nitro-6-phenyl-1-methyl-4H-imidazo[1,2-a][1,4] benzodiazepine;
8-trifluoromethyl-6-phenyl-2-methyl-4H-imidazo[1,2-a] [1,4]benzodiazepine;
9-methylthio-6-phenyl-1-methyl-4H-imidazo[1,2-a][1,4] benzodiazepine;
8-bromo-6-(o-chlorophenyl)-2-methyl-4H-imidazo[1,2-a] [1,4]benzodiazepine;
8-fluoro-6-(o-chlorophenyl)-1-methyl-4H-imidazo[1,2-a] [1,4]benzodiazepine;
8-nitro-6-(m-chlorophenyl)-2-methyl-4H-imidazo[1,2-a] [1,4]benzodiazepine;
8-trifluoromethyl-6-(o-chlorophenyl)-1-methyl-4H-imidazo[1,2-a][1,4]benzodiazepine;
8-methylthio-6-(p-chlorophenyl)-1-methyl-4H-imidazo [1,2-a][1,4]benzodiazepine;
8-chloro-6-(m-fluorophenyl)-2-methyl-4H-imidazo[1,2-a] [1,4]benzodiazepine;
10-bromo-6-(o-fluorophenyl)-2-methyl-4H-imidazo[1,2-a] [1,4]benzodiazepine;
8-fluoro-6-(o-fluorophenyl)-2-methyl-4H-imidazo[1,2-a] [1,4]benzodiazepine;
8-nitro-6-(m-fluorophenyl)-1-methyl-4H-imidazo[1,2-a] [1,4]benzodiazepine;
8-trifluoromethyl-6-(p-fluorophenyl)-1-methyl-4H-imidazo[1,2-a][1,4]benzodiazepine;
9-bromo-7-ethoxy1,2diethyl6-(2,4diethylphenyl)-4H-imidazo[1,2-a][1,4]benzodiazepine;
9-bromo-6-(m-methylsulfonyl)phenyl-1,2-diethyl-4H-imidazo[1,2-a][1,4]benzodiazepine;
10-fluoro-6-phenyl-2,4-dimethyl-4H-imidazo[1,2-a][1,4]-benzodiazepine;
8-nitro-6-phenyl-1,2-dimethyl-4H-imidazo[1,2-a][1,4]-benzodiazepine;
7-trifluoromethyl-6-(m-nitrophenyl)-1-propyl-4H-imidazo[1,2-a][1,4]benzodiazepine;
7-ethylsulfinyl-6-(p-dimethylaminophenyl)-1-methyl-4-ethyl-4H-imidazo[1,2-a[]1,4-benzodiazepine;
8-methylthio-6-phenyl-1,2-dimethyl-4H-imidazo[1,2-a]-[1,4]benzodiazepine;
8-bromo-6-(o-chlorophenyl)-1,2-dimethyl-4H-imidazo [1,2-a][1,4]benzodiazepine;
8-fluoro-6-(p-chlorophenyl)-1,2-dimethyl-4H-imidazo [1,2-a][1,4]benzodiazepine;
8-nitro-6-(p-ethylsulfinylphenyl)-1,2-dimethyl-4H-imidazo[1,2-a][1,4]benzodiazepine;
8-trifluoromethyl-6-(o-chlorophenyl)-1,2-dimethyl-4H-imidazo[1,2-a][1,4]benzodiazepine;
1,2,4,8-tetramethyl-6-(p-chlorophenyl)-4H-imidazo [1,2-a][1,4]benzodiazepine;
8-methylthio-6-(m-chlorophenyl)-1,2-dimethyl-4H-imidazo[1,2-a][1,4]benzodiazepine;
9-propylsulfonyl-6-(o-fluorophenyl)-1,2-dimethyl-4H-imidazo[1,2-a][1,4]benzodiazepine;
9-bromo-6-(p-fluorophenyl)-1,2-dimethyl-4H-imidazo [1,2-a][1,4]benzodiazepine;
7-fluoro-6-(o-fluorophenyl)-1,2-dimethyl-4H-imidazo [1,2-a][1,4]benzodiazepine;
8-nitro-6-(o-fluorophenyl)-1,4-dimethyl-4H-imidazo [1,2-a][1,4]benzodiazepine;
8-trifluoromethyl-6-(o-fluorophenyl)-1,2-dimethyl-4H-imidazo[1,2-a][1,4]benzodiazepine;
8-cyano-6-(p-fluorophenyl)-1,2-dimethyl-4H-imidazo [1,2-a][1,4]benzodiazepine;
8-methylthio-6-(m-fluorophenyl)-1,2-dimethyl-4H-imidazo[1,2-a][1,4]benzodiazepine;
and the like.

EXAMPLE 1

5-chloro-2-[5-methyl-2-[(dimethylamino)methyl]-imidazol-1-yl]benzophenone 8-chloro-1-methyl-6-phenyl - 4H - imidazo[1,2-a][1,4] benzodiazepine (1.23 g., 4.00 mmol.) was dissolved in 5.24 g. of 88% formic acid (60.0 mmol.), 0.70 ml. of 37% formalin was added and the solution placed in an oil bath preheated to 100° C. After 2 minutes an additional 2. ml. of formalin solution (for a total of 2.7 ml. of 36 mmol.) was added and the reaction heated for 1.25 hr. The flask was cooled and the reaction mixture worked up in cold (0–5°) 5% aqueous sodium hydroxide. The resulting oil obtained after extraction with chloroform, drying over anhydrous magnesium sulfate and concentrating was chromatographed over 200 g. of silica gel and eluted with 3% methanol-chloroform. The oil had the following NMR: ($CDCl_3$) 7.21–7.85 (8H, multiplet, aromatic CH), 6.68 (1H, broad singlet, CH=C), 3.21, singlet, $CH_2N$), 2.20 (3H singlet, $CH_3$—C=C), 1.88 (6H, singlet, $[CH_2]_2N$). A few extraneous peaks (very weag) appeared at δ 3.5 and 2.35 and 1.2.

In addition to the oily 5-chloro-2-[5-methyl-2-[(dimethylamino)methyl]imidazol-1-yl]benzophenone (1), 22 mg. of a second component, having melting point of 154–155° was obtained and this was shown to be 5-chloro-2-[5-methyl-4-hydroxymethyl - 2 - [(dimethylamino)methyl]imidazo-1-yl]benzophenone (II).

*Analysis.*—Calcd. for $C_{21}H_{22}ClN_3O_2$ (percent): C, 65.70; H, 5.78; N, 10.95. Found (percent): C, 64.91; H, 5.76; N, 11.45.

EXAMPLE 2

2′,5-dichloro-2-[2-(dimethylamino)methyl]-4-methyl-5-hydroxymethyl-imidazol-1-yl]benzophenone 8-chloro-2-methyl - 6 - (o-chlorophenyl)-4H-imidazo [1,2-a][1,4]benzodiazepine (3.42 g., 10.0 mmol.) was dissolved in 13.1 g. of 88% formic acid. To the resulting solution was added 6.75 ml. of 37% aqueous formalin and the solution was heated to 100–110° C. for 3 hours, then stirred at room temperature for 3 hours. At this point, a small aliquot was removed and quenched in cold (0–5°) 5% aqueous sodium hydroxide solution, extracted with chloroform, dried ($MgSO_4$) and analyzed by thin layer chromatography using silica gel G plates and 10% methanol/chloroform as eluent. One major spot of $R_f$=0.51 was present (starting material had $R_f$=0.63 in this system) along with a slower moving minor component ($R_f$=0.28). The reaction vessel was placed back in the oil bath (set at 100°) and heating was continued overnight for 15 hours. At the end of this period, the entire reaction was quenched in sufficient cold aqueous 5% sodium hydroxide to keep the pH >10 and extraction of the product was made with $CHCl_3$. The organic layer was dried [$MgSO_4$] filtered through diatomeaceous earth and concentrated in vacuo to give an oil which, by thin layer chromatographic analysis as before, consisted almost exclusively of the slow component of $R_f$=0.28. There was no longer evidence of the presence of product of $R_f$=0.51. The oil was crystallized from ethyl acetate to give 2.54 (60.7%) of white prisms of melting point 77–85° C. This solid was recrystallized from EtOAc to give 1.77 g. prisms having M.P. 77–81°. A small portion was recrystallized from acetone to give colorless needles of melting point 73–75° C.

*Analysis.*—Calcd. for $$C_{21}H_{21}Cl_2N_3O_2 \cdot \tfrac{1}{2}CH_3CO_2CH_2CH_3$$

(percent): C, 59.74; H, 5.45; N, 9.09; Cl, 15.33. Found (percent): C, 59.53; H, 5.50; N, 8.96; Cl, 15.37.

EXAMPLE 3

2′,5-dichloro-2-[2-[(dimethylamino)methyl] imidazol-1-yl]benzophenone 8-chloro-6-(o-chlorophenyl) - 4H-imidazo[1,2-a][1,4] benzodiazepine (0.392 g., 1.19 mmol.) was dissolved in 1.31 g., 15.0 mmole of 88% formic acid at room temperature and treated with 0.225 ml. of a 37% aqueous formalin solution (3.0 mmol.). The reaction flask fitted with reflux condenser, was placed in an oil bath preheated to 100° C. A small amount of gas evolution was noted. The solution was removed from the bath momentarily to add an additional 0.45 ml. (6.0 mmol.) of formaldehyde solution. Heating was continued for an additional 1.5 hours. The reaction vessel was cooled, the contents quenched in cold (0–5°) aqueous 5% sodium hydroxide, extracted with chloroform dried over anhydrous magnesium sulfate and concentrated in vacuo. The yellow oil was chromatographed over 30 g. of silica gel to give 300 mg. of very light yellow oil which crystallized from ethyl acetate/hexane, melting point 105–108° C. NMR (CDCl$_3$) 7.18–7.78 (7H multiplet, aromatic CH), 6.81 (2H, AB, J=1.4 cps. CH=CH), 3.22 (2H, singlet, NCH$_2$), 2.12 (6H, singlet, N[CH$_3$]$_2$).

*Analysis.*—Calcd. for C$_{19}$H$_{17}$ClN$_3$O (percent): C, 60.97; H, 4.58; N, 11.23; Cl, 18.94. Found (percent): C, 61.17; H, 4.40; N, 11.08; Cl, 18.73.

EXAMPLE 4

2′,5-dichloro-2-[2-[1-(dimethylamino)ethyl] imidazol-1-yl]benzophenone 4-methyl-8-chloro-6 - (o-chlorophenyl) - 4H-imidazo [1,2-a][1,4]bonzodiazepine (1.23 g., 4.0 mmol.) was dissolved in 5.24 g. (60.0 mmol.) of 88% formic acid at room temperature. An aqueous 37% formalin solution (2.70 ml., 36.0 mmol.) was added and the solution heated at 100° C. for 1 hour. The solution was permitted to cool to room temperautre and quenched in cold (5%) aqueous sodium hydroxide, extracted with chloroform, dried over anhydrous magnesium sulfate and concentrated to give an oil which was taken up in ethyl acetate and crystallized to give 2′,5-dichloro-2[2-[1-(dimethylamino)ethyl]imidazol-1-yl]benzophenone.

EXAMPLE 5

5-bromo-2-[2-[(dimethylamino)methyl] imidazol-1-yl]benzophenone

In the manner given in Example 1, 8-bromo-6-phenyl-4H - imidazo[1,2-a][1,4]benzodiazepine dissolved in formic acid was treated with formalin at 100° C. to give 5-bromo-2-[2-[(dimethylamino)methyl]imidazol - 1-yl]benzophenone.

EXAMPLE 6

5-fluoro-2-[2-[(dimethylamino)methyl]-4,5-di methylimidazol-1-yl]benzophenone

In the manner given in Example 1, 8-fluoro-6-phenyl-1,2-dimethyl-4H-imidazo[1,2-a][1,4]benzodiazepine, dissolved in formic acid, was treated with formalin at 100° C. to give 5-fluoro-2-[2-[(dimethylamino)methyl]-4,5-dimethylimidazol-1-yl]benzophenone.

EXAMPLE 7

2′-fluoro-5-nitro-2-[2-[(dimethylamino)methyl] 5-methylimidazol-1-yl]benzophenone In the manner given in Example 1, 8-nitro-(o-fluorophenyl)-1-methyl - 4H - imidazo[1,2-a][1,4]benzodiazepine, dissolved in formic acid, was treated with formalin at 100° C. to give 2′-fluoro-5-nitro-2-[2-[(dimethylamino)methyl]-5 - methylimidazol - 1-yl]benzophenone.

EXAMPLE 8

4-methylthio-2-[2-[(dimethylamino)methyl] 5-methylimidazol-1-yl]benzophenone

In the manner given in Example 1, 9-methylthio-6-phenyl-1-methyl-4H - imidazo[1,2-a][1,4]benzodiazepine, dissolved in formic acid, was treated with formalin at 100° C. to give 4-methylthio-2-[2-[(dimethylamino) methyl]-5-methylimidazol-1-yl]benzophenone.

EXAMPLE 9

3-bromo-2′-fluoro-3-[2-[(dimethtylamino)methyl] 5-methylimidazol-1-yl]benzophenone In the manner given in Example 1, 10-bromo-6-(o-fluorophenyl)-1-methyl-4H - imidazo[1,2-a][1,4]benzodiazepine, dissolved in formic acid, was treated with formalin at 100° C. to give 3-bromo-2′-fluoro-2-[2-[(dimethylamino)methyl]-5 - methyl-imidazol - 1-yl]benzophenone.

EXAMPLE 10

6-ethylsulfiinyl-4′ - dimethylaminophenyl-2-[2-[(di-methylamino)methyl]-4-ethyl - 5-methylimidazol-1-yl]benzophenone In the manner given in Example 1, 7-ethylsulfinyl-6-(p-dimethylaminophenyl)-1-methyl - 2-ethyl-4H-imidazo [1,2-a][1,4]benzodiazepine, dissolved in formic acid, was treated with formalin at 100° C. to give 6-ethylsulfinyl-4′-dimethylaminophenyl-2 - [2-[(dimethylamino))methyl]-4-ethyl-5-methylimidazol-1-yl]benzophenone.

EXAMPLE 11

5-trifluoromethyl-2-[2-[(dimethylamino)methyl]-5-propylimidazol-1-yl]benzophenone In the manner given in Example 1, 8-trifluoromethyl-6-phenyl - 1-propyl-4H - imidazo[1,2-a][1,4]benzodiazepine, dissoved in formic acid, was treated with formalin at 100° C. to give 5-trifluoromethyl-2-[2-[(dimethylamino)methyl]-5 - propylimidazol - 1-yl]benzophenone.

EXAMPLE 12

3-fluoro-2-[2-[(dimethylamino)methyl]-5-di methylimidazol-1-yl-benzophenone

In the manner given in Example 1, 10-fluoro-6-phenyl-1,2-dimethyl-4H-imidazo[1,2-a][1,4]benzodiazepine, dissolved in formic acid, was treated with formalin at 100° C. to give 3-fluoro-2-[2-[(dimethylamino)methyl]-4,5-dimethylimidazol-1-yl]benzophenone.

EXAMPLE 13

4-bromo-3′-methylsulfonyl - 2-[2-[(dimethylamino)methyl]-4,5-diethylimidazol-1-yl]benzophenone In the manner given in Example 1, 9-bromo-6-(m-methylsulfonylphenyl-1,2 - dimethyl - 4H-imidazo[1,2-a] [1,4]benzodiazepine, dissolved in formic acid, was treated with formalin at 100° C. to give 4-bromo-3′-methylsulfonyl-2-[2-[(dimethtylamino)methyl]-4,5 - diethylimidazol-1-yl]benzophenone.

EXAMPLE 14

2′-fluoro-5-nitro-2-[2-[(dimethylamino)methyl]-4, 5-dimethylimidazol-1-yl]benzophenone In the manner given in Example 1, 8-nitro-6-(o-fluorophenyl)-1,2-dimethyl - 4H-imidazo[1,2-a][1,4]benzodiazepine, dissolved in formic acid, was treated with formalin at 100° C. to give 2′-fluoro-5-nitro-2-[2-[(dimethylamino)methyl]-4,5 - dimethylimidazol - 1-yl]benzophenone.

EXAMPLE 15

3′-nitro-6-trifluoromethyl-2-[2-[(dimethylamino) methyl]-5-propylimidazol-1-yl]benzophenone In the manner given in Example 1, 7-trifluoromethyl-6-(m-nitrophenyl)-1-propyl - 4H - imidazo[1,2 - a][1,4]

benzodiazepine, dissolved in formic acid, was treated with formalin at 100° C. to give 3′-nitro-6-trifluoromethyl-2-[2-[(dimethylamino)methyl]-5 - propylimidazol - 1 - yl] benzophenone.

EXAMPLE 16

2′-chloro-2-[2-[2-(dimethylamino)ethyl]-4,5-dimethyl-imidazol-1-yl]benzophenone

In the manner given in Example 1, 1,2,4,8-tetramethyl-6-(o-chlorophenyl)-4H-imidazo[1,2 - a][1,4]benzodiazepine, dissolved in formic acid, was treated with formalin at 100° C. to give 2′-chloro-2-[2-[2-(dimethylamino)-2-ethyl]-4,5-dimethylimidazol-1-yl]benzophenone.

EXAMPLE 17

4-bromo-6-ethoxy-2′,4′-diethyl-2-[2-[(dimethylamino)methyl]4,5-diethylimidazol-1-yl]benzophenone In the manner given in Example 1, 7-ethoxy-9-bromo-1,2-diethyl-6-(2′,4′-diethylphenyl) - 4H - imidazo[1,2-a]-[1,4]benzodiazepine, dissolved in formic acid, was treated with formalin at 100° C. to give 4-bromo-6-ethoxy-2′,4′-diethyl-2 - [2 - [(dimethylamino)methyl] - 4,5 - diethyl-imidazol-1-yl]benzophenone.

Treatment of the compounds of Formula II with a pharmacologically acceptable acid such as hydrochloric, hydrobromic, phosphoric, sulfuric, acetic, propionic, toluenesulfonic, methanesulfonic, tartaric, citric, lactic, malic, maleic, or cyclohexanesulfamic acids produces the pharmacologically acceptable salts of these compounds of Formula II. The salts can be used for the same purposes as the free base compounds of Formula II.

Salt formation is achieved in conventional manner by reacting the compound of Formula II with an excess of a selected acid in a suitable medium e.g. water, alkanol, ether, or acetone and recovering the salt by evaporating the solvent, preferably in vacuo.

What is claimed is:

1. A compound selected from the group consisting of 2-imidazol-1-yl benzophenone of the Formula II:

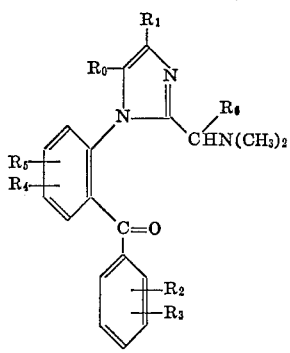

(II)

wherein $R_0$ and $R_1$ are selected from the group consisting of hydrogen and alkyl of 1 to 3 carbon atoms, and hydroxymethyl, inclusive; wherein $R_2$, $R_3$, $R_4$, and $R_5$ are selected from the group consisting of hydrogen, alkyl of 1 to 3 carbon atoms, inclusive, halogen, nitro, trifluoromethyl, and alkoxy, alkylthio, alkylsulfinyl, alkylsulfonyl in which the carbon moieties are of 1 to 3 carbon atoms, inclusive, and dialkylamino, in which alkyl is defined as above; and wherein $R_6$ is selected from the group consisting of hydrogen and alkyl, in which alkyl is defined as above; and the pharmacologically acceptable acid addition salts thereof.

2. The compound according to claim 1, wherein $R_1$, $R_2$, $R_3$, $R_5$, and $R_6$ are hydrogen, $R_4$ is 5-chloro, $R_0$ is methyl and is therefore 5-chloro-2-[2-[(dimethylamino)methyl]-5-methylimidazol-1-yl]benzophenone.

3. The compound according to claim 1, wherein $R_2$, $R_3$, $R_5$, and $R_6$ are hydrogen, $R_4$ is 5-chloro, $R_0$ is methyl, $R_1$ is hydroxymethyl and is therefore 5-chloro-2-[2-[di-methylaminomethyl] - 4 - hydroxymethyl - 5 - methyl] imidazo-1-yl]benzophenone.

4. The compound of claim 1 wherein $R_0$, $R_1$, $R_3$, $R_5$, and $R_6$ are hydrogen, $R_2$ is o-chloro, $R_4$ is 5-chloro and the compound is therefore 2′,5-dichloro-2-[2-[(dimethylamino)-methyl]imidazol-1-yl]benzophenone.

5. The compound of claim 1, wherein $R_0$ is methyl, $R_1$ is hydroxymethyl, $R_3$, $R_5$, and $R_6$ are hydrogen, $R_2$ is o-chloro, $R_4$ is 5-chloro and the compound is therefore 2′,5-dichloro-2-[4 - methyl - 5 - hydroxymethyl - 2 - [(dimethylamino)methyl]imidazol-1-yl]benzophenone.

6. A process for the production of a 2-imidazol-1-yl benzophenone of the Formula II:

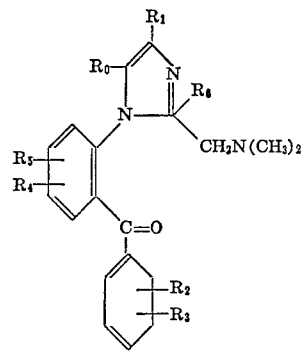

wherein $R_0$, $R_1$, and $R_6$ are selected from the group consisting of hydrogen and alkyl of 1 to 3 carbon atoms, and hydroxymethyl, inclusive; wherein $R_2$, $R_3$, $R_4$, and $R_5$ are selected from the group consisting of hydrogen, alkyl of 1 to 3 carbon atoms, inclusive, halogen, nitro, trifluoromethyl, and alkoxy, alkylthio, alkylsulfinyl, alkylsulfonyl in which the carbon moieties are of 1 to 3 carbon atoms, inclusive, and dialkylamino, in which the alkyl moiety is defined as above, which comprises: heating a solution of a benzodiazepine of Formula I:

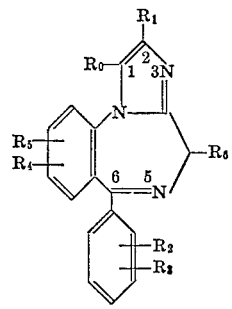

(I)

wherein $R_0$, $R_1$, $R_2$, $R_3$, $R_4$, $R_5$, and $R_6$ are defined as above, in formic acid solution, with formaldehyde at a temperature of 75–100° C. to obtain a compound of Formula II above.

7. The process of claim 6 wherein the selected benzodiazepine is 1-methyl-8-chloro-6-phenyl - 4H - imidazo-[1,2-a][1,4]benzodiazepine and the product obtained is 5-chloro-2 - [2 - [(dimethylamino)methyl] - 5 - methyl-imidazol-1-yl]benzophenone.

8. The process of claim 6 wherein the selected benzodiazepine is 8-chloro-6-(o-chlorophenyl) - 4H - imidazo-[1,2-a][1,4]benzodiazepine and the product obtained is 2′,5-dichloro-2 - [2 - [(dimethylamino)methyl]imidazol-1-yl]benzophenone.

9. The process of claim 6 wherein the selected benzodiazepine is 2-methyl-8-chloro-6-(o - chlorophenyl) - 4H-imidazo[1,2-a][1,4]benzodiazepine and the product is 2′,5-dichloro-2-[4 - methyl - 5 - hydroxymethyl - 2 -[(dimethylamino)-methyl]imidazol-1-yl]benzophenone.

10. The process of claim 6 wherein the selected benzodiazepine is 2-methyl-8-chloro-6-phenyl-4H-imidazo-[1,2-a][1,4]benzodiazepine and the product is 5-chloro-2-[2-[(dimethylaminomethyl]-4-hydroxymethyl-5-methyl]imidazol-1-yl]benzophenone.

References Cited

UNITED STATES PATENTS

| 3,431,304 | 3/1969 | Fryer et al. | 260—239 BD |
| 3,586,693 | 6/1971 | Bell | 260—309 |

OTHER REFERENCES

Chaykovsky et al.: J. Org. Chem., vol. 35, pp. 1178–80 (1970).

Derieg et al.: J. Org. Chem., vol. 34, pp. 179–83 (1969).

NATALIE TROUSOF, Primary Examiner

U.S. Cl. X.R.

260—239 BD; 424—273

Disclaimer 3,763,179.—*Martin Gall*, Kalamazoo, Mich. 2-IMIDAZOL-1-YL BENZOPHENONES. Patent dated Oct. 2, 1973. Disclaimer filed Nov. 17, 1975, by the assignee, *The Upjohn Company*.

Hereby enters this disclaimer to claims 1 and 6 of said patent.

[*Official Gazette February 10, 1976.*]